United States Patent [19]
Preus

[11] 3,795,315
[45] Mar. 5, 1974

[54] CONTROL OF WATERBORNE OIL SLICKS

[76] Inventor: Paul Preus, Smith Rd., Toms River, N.J. 08753

[22] Filed: Jan. 2, 1970

[21] Appl. No.: 214

[52] U.S. Cl. .......................... 210/242, 210/DIG. 21
[51] Int. Cl. ............................................ E02b 15/04
[58] Field of Search ........ 210/DIG. 21, 242, 36, 40; 61/1 F

[56] References Cited
UNITED STATES PATENTS
2,682,151   6/1954   Simpson et al. ............ 210/DIG. 21
3,382,170   5/1968   Pape ............................ 210/DIG. 21

FOREIGN PATENTS OR APPLICATIONS
92,320       9/1968   France ......................... 210/DIG. 21
1,529,754   5/1968   France ......................... 210/DIG. 21

Primary Examiner—Samih N. Zaharna
Assistant Examiner—Thomas G. Wyse

[57] ABSTRACT

An apparatus and process for controlling waterborne oil slicks wherein a floating barrier having a fluid pervious skirt is positioned in a controlling position relating to the slick and an oleophilic-hydrophobic fiberous substance is introduced into the slick to absorb the oil and render it impenetrable of the skirt.

1 Claim, 6 Drawing Figures

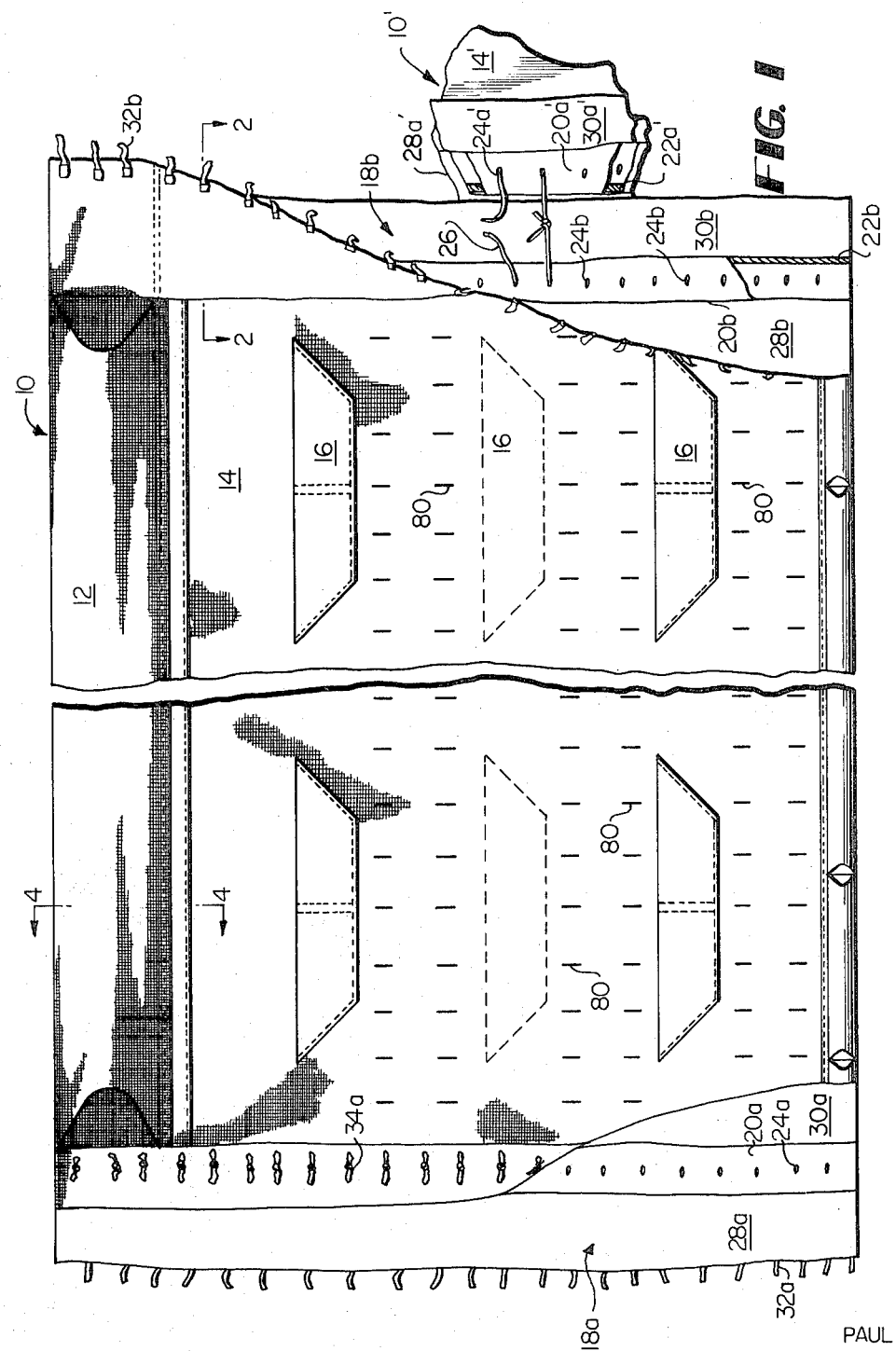
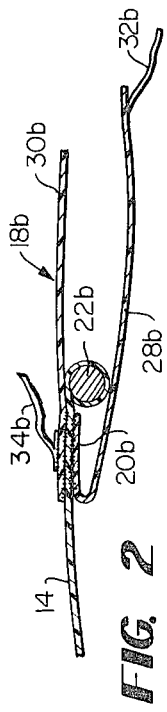
FIG. 1
FIG. 2
INVENTORS
PAUL PREUS
BY *John J. Gallagher*
ATTORNEY PATENTED MAR 5 1974 3,795,315
SHEET 2 OF 2
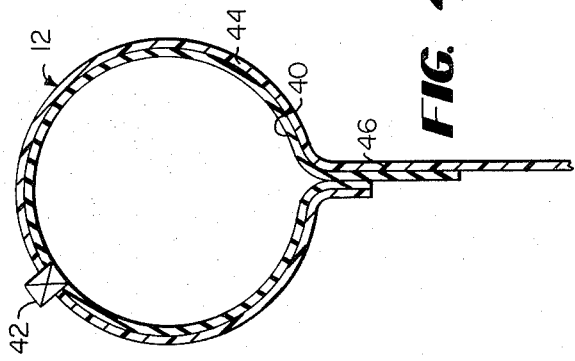
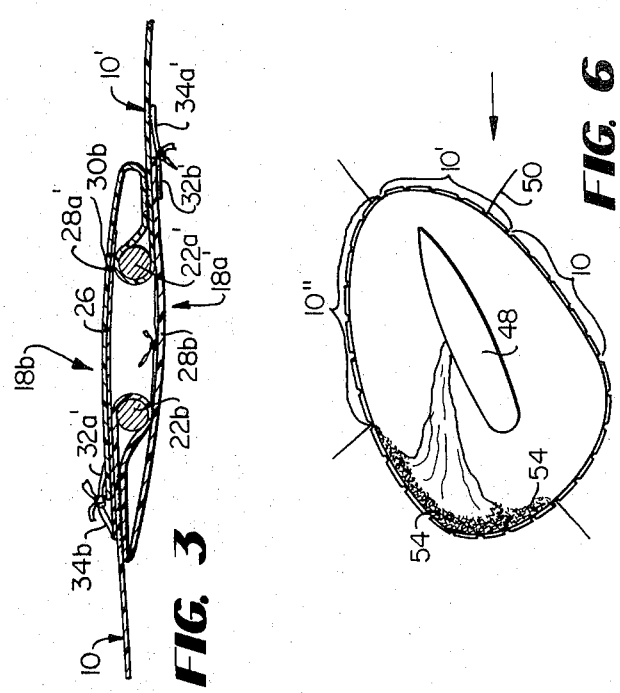
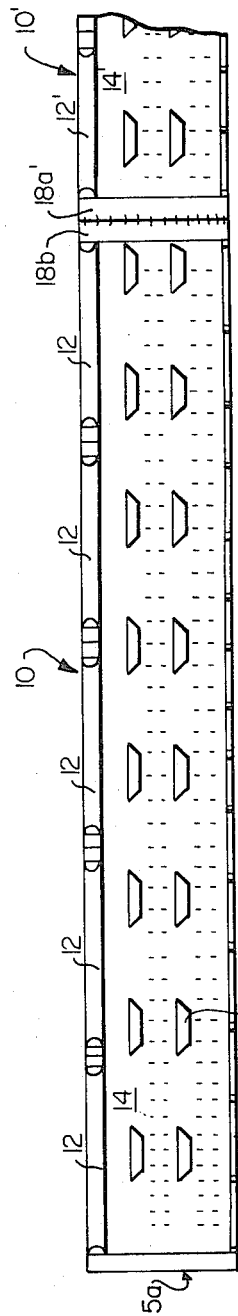
INVENTORS
PAUL PREUS
BY *John Gallagher*
ATTORNEY

CONTROL OF WATERBORNE OIL SLICKS

BACKGROUND OF THE INVENTION

This invention relates generally to the control of waterborne contaminate films and more particularly to the control of waterborne petroleum slicks. With the advent of offshore oil recovery and the utilization of oil tankers of increasingly greater capacities, the danger of catastrophic petroleum spills on water with attendant large scale damage to property and marine life has become extremely acute. This, coupled with water pollution legislation aimed at reducing or eliminating contamination from more gradual, continuing sources of pollution has placed great emphasis on the need for control of waterborne petroleum spills from any source.

Heretofore, floating barriers of many types have found utility in controlling petroleum spills on relatively calm or slowly flowing inland bodies of water. However, because of the high wind and hydrodynamic forces encountered, such devices have been found to be impractical for even moderate conditions on the high seas. This is true since barriers suitable for high sea conditions must present sufficient fluid impermeable barrier surface to prevent lifting from the water due to wind and/or wave action while, at the same time, the hydrodynamic pressure on the presented surface generates tension forces which exceed the strength of reasonably designed barriers.

SUMMARY OF THE INVENTION

This invention relates to a barrier system which overcomes the disadvantages of the prior art by providing means to contain a petroleum slick within the barrier while avoiding forces generated by hydrodynamic pressure.

The invention further provides a barrier system for avoiding the imposition of hydrodynamic pressure on the barrier by furnishing a fluid pervious skirt and providing means to render petroleum slicks impenetrable of the skirt.

The invention furthermore provides a system for controlling a petroleum slick without emulsifying, dispersing, or contaminating the ocean bed by furnishing an oil absorbent material which remains flotable and non-water absorbent.

The invention also provides means to render a waterborne petrolum slick impenetrable of a fluid pervious barrier skirt by furnishing a fiberous oleophilic - hydrophobic material which, when contacted by the petroleum, absorbs it and renders it impenetrable of the skirt.

In a preferred embodiment, the invention provides a waterborne petroleum slick controlling system including a floating barrier comprising a plurality of interconnected segments, each segment having an inflatable flotation member, and a fluid pervious skirt depending from the barrier; and an oleophilic - hydrophobic fiberous substance which, when contacted by petroleum in the slick, renders it impenetrable of the fluid pervious skirt.

These and other objects and advantages of the invention will become more obvious to those skilled in the art by reference to the following detailed description when viewed in light of the accompanying drawings wherein like numerals throughout the FIGS. indicate like components and wherein:

BRIEF DESCRIPTION OF THE DRAWINGS

FIG. 1 is a fragmentary elevational view of a barrier segment in accordance with the invention;

FIG. 2 is a fragmentary sectional view of a portion of the segment of FIG. 1 taken along the lines 2—2 thereof;

FIG. 3 is a sectional view similar to FIG. 2 showing the interconnection between two adjacent segments;

FIG. 4 is a fragmentary sectional view of the segment of FIG. 1 taken along the lines 4—4 thereof;

FIG. 5 is a reduced elevational view showing the barrier segment of FIG. 1 connected to an adjacent segment, and FIG. 6 is a reduced plan view of a barrier made of segments in accordance with FIG. 1, deployed around a casualty and functioning in accordance with the invention.

DETAILED DESCRIPTION OF A PREFERRED EMBODIMENT

In FIG. 1 a barrier segment shown generally at 10, comprises a flotation section 12 and a skirt 14. A plurality of pockets 16 are disposed over both surfaces of the skirt 14 for purposes to be explained below.

The segment 10 is provided, at each end, with connecting means shown generally at 18a and 18b, which provide for interconnection with like segments to form a barrier as will be described in greater detail below. With specific reference to means 18b, in which the components thereof will be indicated with the appropriate suffix, a hemmed portion 20b encloses a reinforcing line 22b to provide suitable tension strength at the margin of the segment 10. A plurality of eyelets 24b are formed through the hemmed portion 20b to receive a tie 26 which connects the segment 10 to an adjacent segment, shown in FIG. 1 in fragmentary form at 10'. As hereinafter used, components of adjacent segments corresponding to like components of segment 10 will be indicated with the appropriate prime.

As can be seen by reference to the figure, insertion and connection of the ties 26 through each of the adjacent eyelets 24b and 24a provides mechanical interconnection of the adjacent segments 10 and 10'. To provide a fluid seal at the connection, a pair of flaps 28b and 30b bracket the hemmed portion 20b, the flap 28d being provided with a series of tie-ties 32b along the edge thereof. The flaps 28a and 30a on the other end of the segment 10 are reversed, front-to-back, and it can be seen that a second series of tie-ties 34a are provided along the joint of the flap 30a and the segment 10.

The joints and seams of the aforedescribed structure are preferably formed by stitching and/or heat sealing where the material of the barrier so permits.

A bottom hem 36 is formed along the lower margin of the skirt 14 and is filled with a heavy material such as sand, or the like to provide a ballest means for the skirt.

The skirt 14 is preferably formed from an open mesh, fabric reinforced sandwich of sheet plastic. Although many materials are suitable for this purpose, it has been found that a nylon fabric having one-sixteenth inch mesh sandwiched between polyvinylchloride sheet plastic is particularly suitable for this purpose. Such material is marketed under the trade name HERCU-LITE 80 by the Herculite Division of Eckna Co., Inc. of New York, New York.

In order to relieve hydrodynamic pressure, as hereinabove discussed, the skirt 14 is provided with a multiplicity of openings 38 across the surface thereof. In the embodiment illustrated, these openings consist of vertical slits approximately one-half inch in length and disposed in a regular order of a series of horizontal rows over the length of the skirt. Although the preferred order and spacing of the openings 38 for a particular condition can best be determined by experimentation, the following distribution has been found to be suitable for use under moderate conditions on the high seas:

vertical opening length: ½ inch
spacing between openings: 18 inches
vertical distance between rows: 18 inches The uppermost row of openings 38 is disposed 18 inches from the top of the skirt 14.

The pocket 16 functions as a hold down for the barrier especially when it is subjected to high winds. The pockets function in a manner similar to that of a sea anchor and fill with water, thereby adding to the skirt the weight of the water encompassed by the pockets, when the skirt 14 moves upwardly in the water.

The pockets may be of any size and distribution desired. However, it has been found that pockets having the following effective dimensions are particularly suitable for the purposes of the invention:

pocket length: 37 inches
pocket height: 9 inches
pocket spacing: vertical (between rows: 8 inches on both sides); horizontal: 12 inches The pockets are attached to the skirt with slack along at least the upper edge thereof so that they will function upon the least upward movement of the barrier.

The initial row of pockets is spaced from the top of the skirt 14 by a vertical distance of 8 inches. As illustrated, the pockets 16a preferably subdivided by a vertical heat sealed portion connected to the skirt 14 midway between the ends thereof.

In FIGS. 2 and 3, details of the connecting means 18b and 18a, respectively, are shown in sections with the interconnection between the respective flaps and the tie-ties completed in FIG. 3.

In FIG. 4, the construction of the flotation section 12 is shown in detail. The section comprises an inner, air containing chamber 40 made of an air impervious material which is preferably heat sealable to form an air tight chamber. Polyethylene, polystyrene or the like are materials suitable for this purpose. A valve 42, of any type known in the art, provides communication with the interior of the chamber 40 to provide a filling means therefore. The chamber is preferably enclosed by a jacket 44, suitably fabricated from the same material as the skirt 14, if so desired, which furnishes both protection for the chamber 40 against mechanical damage and a means for interconnecting the flotation section 12 and the skirt 14 preferably through a sewn seam at 46.

Other flotation means such for example as rigid flotable collars or other chambers may obviously be provided, if so desired, without exceeding the scope of this invention. The skirt 14 may also be fabricated in other suitable form so long as there is an essentially equivalent water perviousness and/or solid imperviousness to that of the skirt described herein.

With reference now to FIG. 5, a full segment 10 is shown attached to the adjacent segment 10'. The overall dimension of the segment 10 can be as desired or dictated by use, handling and/or storage conditions, however, it has been found that segments having the following approximate characteristics are particularly suitable for use in conjunction with the invention:

segment (10) length: 50 feet
skirt (14) height: 9½ feet
flotation section (12)
  diameter: 30 inches
  length: 9 feet 3 inches
horizontal distance between sections 12: 1 foot In FIG. 6, a circular barrier, composed of a plurality of segments 10, 10', 10'', etc., is shown in use and moored around a casualty 48 by means of a plurality of anchored lines 50 or the like. With the current in the direction of the arrow, the configuration of the barrier and the pattern of flow of coil 52 from the casualty 58 would be generally as illustrated.

The barrier, being water pervious, cannot alone retain oil within the confines thereof. It is therefore a part of this invention to incorporate a more solid substance which is oleophilic or absorbs oil and which in itself cannot pass through the openings 38 in the barrier segments 10. Such a substance must also be water repellant (hydrophobic) or at least non-water absorbent such that it will continue to float for an indefinite period of time. A material which suitably meets these requirements is a fiberous compound of expanded perlite with clays and fibrous material sold under the trade name Sorbent "Type C" by Clean Water, Inc. of Toms River, N.J. This material, indicated at 54, is spread on the water with the barrier and acts to absorb and substantially coagulate the oil 52 such that it cannot pass through the openings 38 in the barrier segments 10 thereby providing for a reduction of hydrodynamic forces on the barrier through the water permeability thereof while providing for retention and "filtration" of oil within the confines of the barrier.

Obviously, the barrier segments may be disposed other than illustrated and utilized to confine spills on or near beaches or to channel spills to points of disposition or away from sensitive means as desired.

Once the oil is absorbed by the sorbent material, it can readily be removed by mechanical means such as nets, vacuum machines or the like.

What is set forth above is intended as exemplary to enable those skilled in the art to practice the invention.

What is new and therefore desired to be protected by Letters Patent of the United States is:

1. A control device for waterborn oil slicks comprising:
   a barrier partly submerged in a body of water and disposed in a controlling position relative to an oil slick floating thereon, said barrier comprising a floatation means and a skirt depending from said floatation means, said skirt having a continuous fluid impervious portion along the waterline thereof and being rendered fluid pervious by openings therein disposed substantially uniformly across the surface area below the waterline thereof to allow ready passage of water therethrough below the waterline and thereby minimize hydrodynamic pressure thereon while precluding passage thereby of substances floating on the water; and
   a floatable oleophilic-hydrophobic substance comprising expanded perlite compounded with clay and a fibrous base disposed on the oil slick to render it substantially impeneterable of said skirt; whereby said substance absorbs and renders oil from said slick impenetrable of said barrier.

* * * * *